United States Patent [19]
Di Antonio

[11] 3,960,243
[45] June 1, 1976

[54] ADAPTER BUSHING FOR LUBRICATION SYSTEM

[75] Inventor: Daniel Joseph Di Antonio, Nutley, N.J.

[73] Assignee: Litton Systems, Inc., Passaic, N.J.

[22] Filed: May 7, 1975

[21] Appl. No.: 575,254

[52] U.S. Cl. .............................. 184/6; 198/192 R; 308/240
[51] Int. Cl.² .......................................... F16N 7/24
[58] Field of Search .............. 184/6, 6.17, 6.19, 18, 184/105; 198/192 R, 193; 308/237, 238, 240, DIG. 2

[56] References Cited
UNITED STATES PATENTS

| | | | |
|---|---|---|---|
| 2,596,499 | 5/1952 | Mercier | 198/192 R |
| 3,332,536 | 7/1967 | Ebly | 184/6 |
| 3,338,381 | 8/1967 | Imse | 198/192 R |
| 3,489,471 | 1/1970 | Kelley | 198/192 R |
| 3,892,306 | 7/1975 | Bertaud | 198/192 R |

*Primary Examiner*—Richard J. Apley
*Assistant Examiner*—Marvin Siskind
*Attorney, Agent, or Firm*—Morris I. Pollack

[57] ABSTRACT

A series of flexible, substantially cylindrical tubes communicates with the hollow central shafts of adjacent idler rolls so that lubrication introduced through a grease fitting at one end of the idler roll assembly can be distributed evenly to all of the rolls. Each tube is secured in position by insertion of its opposite ends into the adjacent ends of the hollow shafts of the idler rolls. Conventionally, such shafts are counterbored and tapped at each end and thus require a thicker material shell with a smaller bore to suit the tap size; thus requiring more material and cost.

8 Claims, 5 Drawing Figures

ADAPTER BUSHING FOR LUBRICATION SYSTEM

BACKGROUND OF THE INVENTION

1. Field of the Invention

The instant invention relates generally to idler rolls and idler roll sets; and more particularly to a simplified device and construction for the ends of hollow idler roll shafts to facilitate attachment thereto of either a threaded grease fitting, or a tube interconnecting the shaft of one idler roll to the shaft of an adjacent idler roll for feeding grease therethrough.

2. Prior Art

Numerous attempts have been made to design a lubrication system which will effectively lubricate the entire series of three or more idler rolls when a grease gun is applied to a fitting situated at one end of the series of rolls. In addition to possessing the ability to effectively distribute the lubricant, the system must be flexible to permit the angularity of the adjacent rolls to be altered without impairing the communication between adjacent rolls.

One attempt to realize these goals is set forth in U.S. Pat. No. 3,338,381, granted Aug. 27, 1967 to Philip J. Imse. Such patent utilizes a pair of short resilient tubular members retained in operative position within a unique split housing to establish communication between the hollow central shafts of adjacent rolls. Radial ports in the shaft of each roll in the series of rolls permit a limited quantity of the lubricant to flow outwardly and lubricate the bearings situated at the opposite ends of the shaft for each roll.

However, to secure the resilient tubular members to the end caps on the opposite ends of the hollow shaft passing through each roll, cooperating screw threads must be formed between the exterior surface of the tubular members and the walls of the axial passage in the end cap into which the member is inserted. Forming threads on the exterior surface of a flexible tubular member while maintaining its concentricity is a difficult chore, and if the execution is faulty, the flexible member may slip out of the end cap as the rolls are replaced or adjusted relative to one another. Also, the split-housing requires a captive screw for retaining the pair of tubular members in operative relationship. Such construction, therefore, requires that additional components be stocked for inventory, thus adding an undesirable cost factor to the maintenance and operation of the idle roll set.

SUMMARY OF THE INVENTION

Thus, with the deficiencies of the prior art structures as exemplified by the disclosure of the Imse patent clearly in mind, the instant invention contemplates a lubrication system for idler rolls that securely locks the opposite ends of lubrication tubes within the hollow shafts of adjacent idler rolls. Additionally, the instant invention contemplates the employment of an identical end cap at each end of the hollow shaft for an idler roll so that each roll of the idler roll set, and particularly the outer or wing rolls in a three roll set, can be installed without concern for an inner or outer end orientation. In some prior art systems, care had to be exercised to properly orient the idler roll, for one end of the hollow shaft relied upon an end cap designed to receive a threaded nipple through which the lubricant would be introduced into the system, while the other end of the hollow shaft relied upon an end cap designed to accept a lubrication tube.

The secure locking of the resilient tube in the hollow shaft, as well as the new-found ability of the hollow shaft to passage in the end cap into which the member is inserted. Forming threads on the exterior surface of a flexible tubular member while maintaining its concentricity is a difficult chore, and if the execution is faulty, the flexible member may slip out of the end cap as the rolls are replaced or adjusted relative to one another. Also, the split-housing requires a captive screw for retaining the pair of tubular members in operative relationship. Such construction, therefor, requires that additional components be stocked for inventory, thus adding an undesirable cost factor to the maintenance and operation of the idle roll set.

SUMMARY OF THE INVENTION

Thus, with the deficiencies of the prior art structures as exemplified by the disclosure of the Imse patent clearly in mind, the instant invention contemplates a lubrication system for idler rolls that securely locks the opposite ends of lubrication tubes within the hollow shafts of adjacent idler rolls. Additionally, the instant invention contemplates the employment of an identical end cap at each end of the hollow shaft for an idler roll so that each roll of the idler roll set, and particularly the outer or wing rolls in a three roll set, can be installed without concern for an inner or outer end orientation. In some prior art systems, care had to be exercised to properly orient the idler roll, for one end of the hollow shaft relied upon an end cap designed to receive a threaded nipple through which the lubricant would be introduced into the system, while the other end of the hollow shaft relied upon an end cap designed to accept a lubrication tube.

The secure locking of the resilient tube in the hollow shaft, as well as the new-found ability of the hollow shaft to receive either threadless plastic lubrication tubes or threaded metal nipples, is attributable to the provision of a plastic, thimble-shaped adapter bushing that is press-fit into the hollow shaft prior to the installation of the end nut. The malleability and self-lubricating qualities of the adapter bushing enable a threaded metal nipple to cut its own threads therein and/or a resilient tube to be frictionally retained therewithin.

Other significant advantages attributable to the provision of the plastic adapter bushing for use within the lubrication system for idler rolls will become readily apparent to the skilled artisan when the following detailed description of the invention is construed in harmony with the appended drawings.

DESCRIPTION OF THE INVENTION

Figure 1:
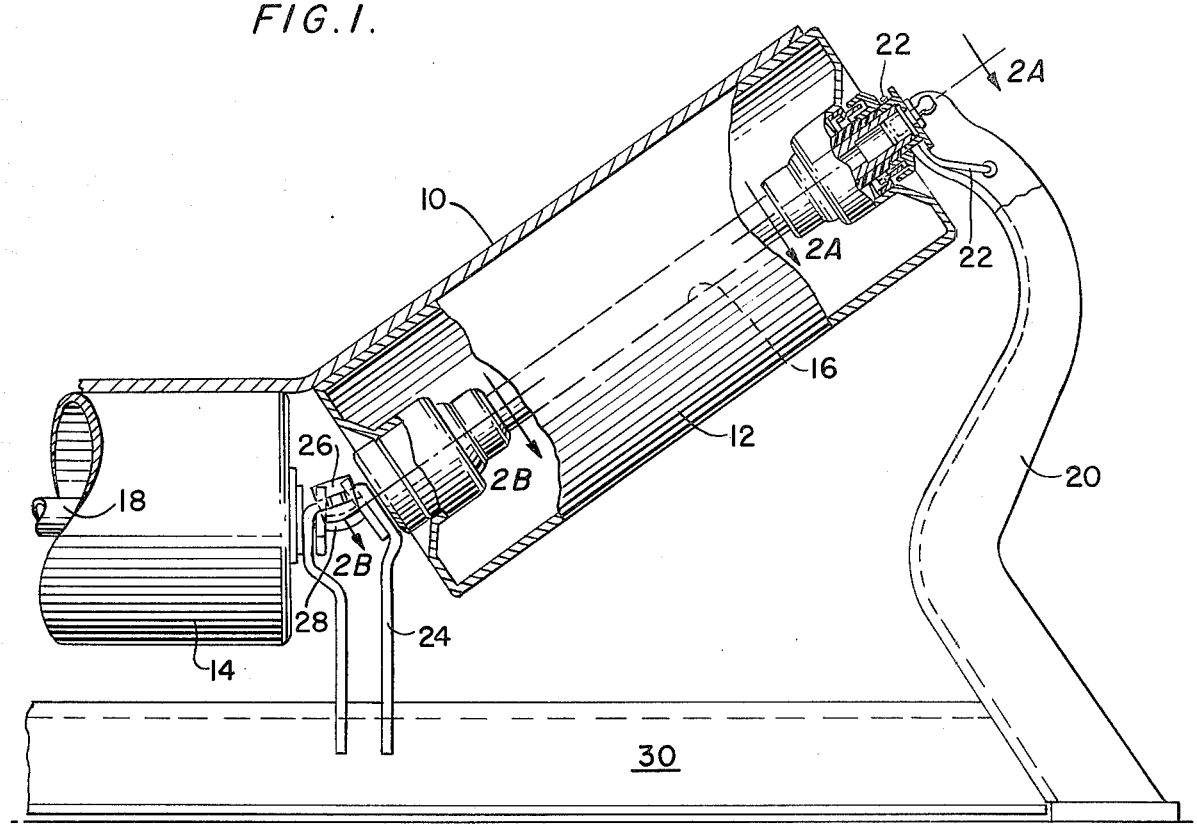
FIG. 1 is a front elevational view of a wing roll and a fragment of a center roll of an idler roll set, portions of the wing roll being broken away to show the interior thereof.

Referring now to the drawings, FIG. 1 shows the right hand half of an idler roll set for supporting the upper run of a conveyor 10. The idler roll set includes an outer or wing roll 12, and a central roll 14, and a second outer or wing roll (now shown). The set has been divided in half for the purposes of illustration, but it will be appreciated that the right hand half and the left hand half (not shown) of the set are mirror images of one another. Roll 12 is mounted for rotation about hollow shaft 16 which extends axially therethrough, and roll 14 is mounted for rotation about an identical hollow shaft 18. The outer end of wing roll 12 is seated in an aperture in end bracket 20, and a resilient spring 22 locks the roll in fixed position. The inner end of the roll 12 is seated in an aperture in interior bracket 24, as is one of central roll 14. A keeper 26 locks both rolls in fixed position with the bracket 24, and a resilient lubrication tube 28 extends between the adjacent rolls to establish communication between hollow shafts 12 and 18. A transverse brace 30 imparts structural rigidity to the roll set.

Figure 2B:
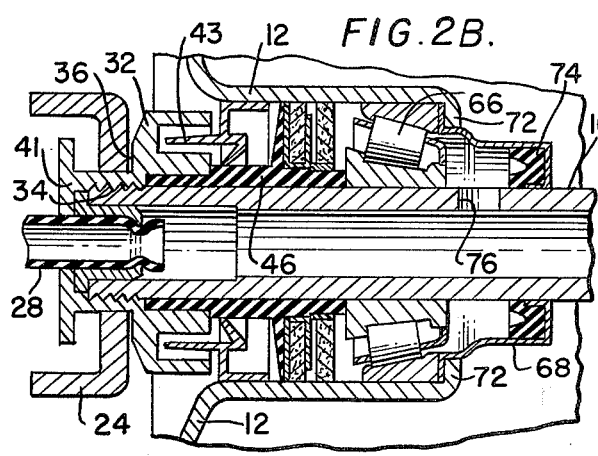
FIGS. 2A and 2B are elevational views of the opposite ends of the wing roll, such views being taken on an enlarged scale along lines 2A—2A and 2B—2B in FIG. 1 and in the directions indicated.
Figure 2A:
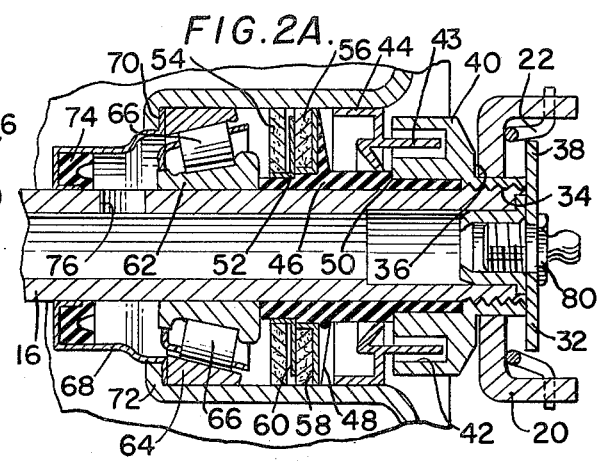

FIGS. 2A and 2B depict, on an enlarged scale, the opposite ends of the idler roll 12 with the outer casing removed. Examining FIG. 2A first, one notes that metallic end cap 32 is shaped to perform multiple functions. An internally threaded span 34 is defined in its body so that it can be screwed onto the complementary threads on the end of hollow shaft 16, and an annular, laterally extending groove 36 is formed in the end cap between enlarged outer ledge 38 and the main body 40. The groove 36 fits into the aperture in end bracket 20 when roll 12 is seated.

An annular opening 41 extends through the end cap 32; the wall defining the opening is threaded to receive the body of a metallic fitting. An axially extending chamber 42 is located in the main body 40 of the end cap, and the protrusion 43 of contact seal 44 extends therein. The end cap and the contact seal cooperate to keep dust and small particles from reaching the bearings and otherwise adversely affecting the functioning of the idler rolls.

A stepped sleeve 46 extends axially along shaft 12 from the thrust bearings to a point well within the main body 40 of end cap 38. Sleeve 46 is prevented from rotating by slug nut 32 and components 54 and 56 mounted thereon rotate relative to shaft 16. A radially extending fin 48 is located on sleeve 46, a first shoulder 50 is situated near its outer end, and a second shoulder 52 is situated near its inner end. Fin 48 properly positions cork rings 54, 56 and rigid discs 58, 60, while first shoulder 50 serves as a stop for accurately seating end cap 32. Second shoulder 52 seats the rigid discs 60 and cork ring 54.

An inner raceway 62 extends about shaft 12, as does an outer raceway 64, and tapered bearings 66 are mounted therebetween so that the roll can rotate freely relative to fixed shaft 12. A metal retainer shell 68 with an upturned flange 70 is secured to the inwardly extending flange 72 of the innermost projection of the casing of roll 12, and a back-seal 74 is inserted into the end of shall 68 remote from flange 70. An aperture or port 76 extends radially through shaft 12 and establishes communication between the hollow interior of shaft 16 and the bearing cavity defined within shell 68.

When the idler roll set is to be lubricated, fitting 80 is unscrewed from its engagement with the threaded opening 41 in end cap, which, in turn, has been screwed onto the threaded outer end of wing roll 12, and a grease gun is inserted through opening 41 into the hollow shaft 16. Alternatively, fitting 80 may be constructed with an axial passageway and a check valve (not shown) so that a grease gun can be operatively associated therewith while the fitting remains secured within the end cap 32. In either instance, grease or some other lubricant is introduced, under pressure, into the hollow shaft 12 and is forced through the series of idlers in each idler set. A portion of the lubricant exits through each of the apertures or ports 76 spaced at opposite ends of each idler roll shaft 12, fills the cavity within each shell 68, and lubricates bearings 66. Cork rings 54, 56 act as check valves to contain the lubricant until all of the plurality of bearings 66 in the idler roll set are filled. The rigid discs 58, 60, in combination with the cork rings, form a labyrinth grease seal which prohibits excess lubricant from oozing out of the bearings. The lubricant is conveyed between the hollow shafts in adjacent rolls by resilient lubrication tubes 28.

In order to secure fitting 80, which is externally threaded along its metallic body, into the opening 41 in the end cap 32, the wall defining the opening 41 must be internally threaded in a complementary manner. In order to secure lubrication tube 28, which is a threadless resilient plastic member, into the hollow shaft 16 adjacent to end cap 32, the wall of the shaft and/or the end cap must be tapered inwardly so it can deform and capture the end of the lubrication tube 28. Alternatively, radially extending lugs can be formed in an axial passage in the end cap to deform and capture the end of the lubrication tube 28. Previously, due to the different requirements for securing fitting 80 and lubrication tube 28 in operative relation to the hollow shaft 16 proximate to end caps 32, one variety of end cap was employed at one end of the shaft 12 and a second, different variety of end cap was employed at the opposite end. Consequently, the idler rolls had to be carefully installed and oriented with each variety of end cap facing in a particular direction.

Figure 3:
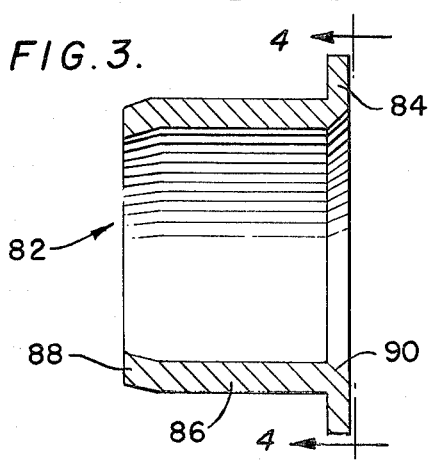
FIG. 3 is a side elevational view of an adapter bushing constructed in accordance with the principles of the instant invention.
Figure 4:
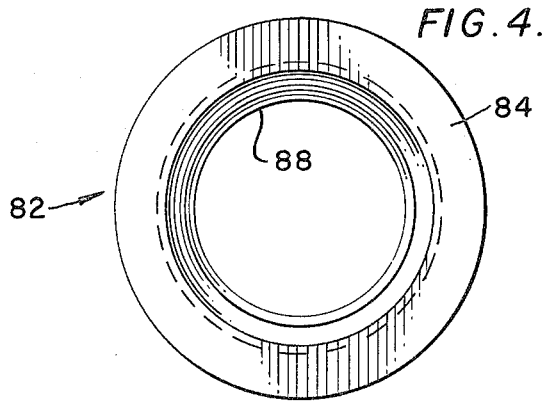
FIG. 4 is a front elevational view of the adapter bushing, such view being taken along line 4—4 in FIG. 3 and in the direction indicated.

However, in contrast to known lubricating systems and conventional practices which included sundry boring and counterboring steps in the end caps and the hollow shaft to which they were secured, the inventive thrust of the present disclosure is directed to a unique adapter bushing designated generally by reference numeral 82, which is fully compatible with both lubrication tubes 28 and fittings 80. As shown on a greatly enlarged scale in FIGS. 3 and 4, adapter bushing 82 comprises an enlarged lip 84, a cylindrical body 86 that terminates in an inwardly tapering segment 88, and a short throat 90 that leads from the lip 84 into the body 86. Adapter bushing 82 is fabricated from a malleable, self-lubricating plastic; TEFLON is but one of several commercially available plastics that exhibit such desirable characteristics, while nylon is equally suitable.

As shown in FIGS. 2A and 2B, one adapter bushing 82 is press-fitted or forced securely into position within hollow shaft 16. The end cap 32 is screwed into engagement with the threaded exterior surface of shaft 16; the end cap surrounds the bushing with the opening 41 in alignment with the body of the bushing. Then the fitting 80 is advanced through opening 41 and into adapter bushing 82. Since the fitting has external threads on its body and adapter bushing 82 is more malleable than the fitting, the fitting cuts its own threads in the adapter bushing as it is advanced thereinto. At the opposite end of shaft 16, resilient lubrication tube 28 is simply inserted through opening 41 in end cap 32 into adapter bushing 82 until the tapering segment 88 radially deforms the tube and frictionally locks it within the adapter bushing, end cap 32 and shaft 16. Throat 90 acts as a funnel to guide the tube 28 as it is inserted into the shaft.

Various modifications in the size, shape and materials selected to be utilized in the representative lubrication system described above will become apparent to the skilled artisan. Consequently, the appended claims should be liberally construed in a manner consistent with the contribution to the useful arts and sciences to which the instant invention appertains.

I claim:
1. A lubrication system for an idler roll, comprising, in combination:
   a. an idler roll, having an outer housing and a hollow shaft extending axially therethrough,
   b. bearings mounting the housing of said idler roll for rotational movement about its hollow shaft,
   c. said hollow shaft having radial ports adjacent to the bearings,
   d. end caps secured to the exterior surface of the hollow shaft at opposite ends, each end cap having a centrally located annular opening extending therethrough,
   e. plastic adapter bushings, each bushing inserted into the interior of the hollow shaft, and in alignment with the opening in the end cap,
   f. said plastic adapter bushings being formed to receive either a grease fitting when inserted through said end cap and into the adapter bushings or a resilient lubrication tube when inserted through the end caps into the adapter bushings, so that lubricant may be introduced under pressure through the grease fittings or so that lubricant once inserted will be forced through the radial ports to lubricate the bearings and will travel from the roll via the lubrication tube secured to the adapter bushing.

2. The lubrication system as defined in claim 1 including a grease fitting, the grease fitting has a body with external threads formed thereon, and each of said adapter bushings is fabricated from a malleable, self-lubricated plastic that will enable complementary teeth to be cut in the adapter bushing as the grease fitting is advanced thereinto.

3. The lubrication system as defined in claim 2 wherein the grease fitting has a body with external threads formed thereon, and each of said adapter bushings is fabricated from a malleable, self-lubricated plastic that will enable complementary teeth to be cut in the adapter bushing as the metallic fittings are advanced thereinto.

4. The lubrication system as defined in claim 1 wherein said adapter bushing comprises an enlarged lip and a cylindrical body, the lip firmly seating the adapter bushing against the outer end of the hollow shaft.

5. The lubrication system as defined in claim 4 wherein the cylindrical body of said adapter bushing terminates in an inwardly extending segment, said segment radially deforming and frictionally securing a lubrication tube inserted thereinto.

6. A lubrication system for a plurality of idler rolls including a resilient adapter bushing, said system comprising:
   a. at least a pair of idler rolls, each roll having an outer housing and a hollow shaft extending axially therethrough,
   b. bearings mounting the housing of each idler roll for rotational movement about its hollow shaft,
   c. each hollow shaft having radial ports adjacent to the bearings,
   d. end caps secured to the opposite ends of each hollow shaft, each end cap having a centrally located annular opening,
   e. metallic grease fittings, each fitting having a body portion with external threads for securement within certain ends of the hollow shafts in proximity to the opening in an end cap,
   f. resilient plastic lubrication tubes secured within the remaining ends of the hollow shafts,
   g. said adapter bushing being designed to be installed directly into the opposite ends of the hollow shaft in alignment with the openings in end caps, said adapter comprising:
      1. an enlarged lip and a cylindrical body, the lip enabling the adapter bushing to be pressed into engagement with the hollow shaft with the body extending axially into the interior of said hollow shaft,
      2. the cylindrical body terminating in an inwardly extending segment that can radially deform and frictionally lock in fixed position a resilient tube inserted into the hollow shaft of an idler roll, and
      3. the adapter bushing being executed in a malleable, self-lubricating plastic so that metallic grease fittings can be fastened therein by cutting their own threads as they are advanced thereinto.

7. A lubrication system for a plurality of idler rolls, comprising, in combination:
   a. at least a pair of idler rolls, each roll having an outer housing and a hollow shaft extending axially therethrough,
   b. bearings mounting the housing of said idler roll for rotational movement about its hollow shaft,
   c. said hollow shaft having radial parts adjacent to the bearings,
   d. end caps secured to the exterior surface of the hollow shaft at opposite ends, each end cap having a centrally located annular opening extending therethrough,
   e. plastic adapter bushings, each bushing inserted into the interior of the hollow shaft, and in alignment with the opening in the end cap,
   f. metallic grease fittings inserted through certain ones of said end caps into the adapter bushings, and
   g. resilient lubrication tubes inserted through the remaining end caps into the adapter bushings, so that when lubricant is introduced under pressure through one of the grease fittings it will be forced through the radial ports to lubricate the bearings and will travel from roll to roll via the lubrication tubes secured to the adapter bushings.

8. The lubrication system as defined in claim 6 wherein the cylindrical body of said adapter bushing terminates in an inwardly extending segment, said segment radially deforming and frictionally securing a lubrication tube inserted thereinto.

* * * * *